United States Patent [19]

Cupery

[11] 3,843,667

[45] Oct. 22, 1974

[54] N-IMIDAZOLE COMPOUNDS AND THEIR COMPLEX METAL DERIVATIVES

[76] Inventor: Martin E. Cupery, 7 Crestfield Rd., Wilmington, Del. 19810

[22] Filed: Sept. 12, 1973

[21] Appl. No.: 396,605

[52] U.S. Cl............... 260/299, 75/101 BE, 210/38, 260/309, 260/309.2, 260/309.6, 423/24, 423/89, 423/99, 423/139, 423/658.9
[51] Int. Cl............................................. C07d 49/34
[58] Field of Search ...... 260/299, 309, 309.2, 309.6

[56] References Cited
UNITED STATES PATENTS

| | | | |
|---|---|---|---|
| 3,049,492 | 8/1962 | DeGroote et al. | 252/8.55 |
| 3,276,863 | 10/1966 | Drobnick et al. | 75/108 |
| 3,803,165 | 4/1974 | Beaman et al. | 260/309 |

FOREIGN PATENTS OR APPLICATIONS

| | | |
|---|---|---|
| 1,940,388 | 2/1970 | Germany |
| 2,041,771 | 2/1972 | Germany |

OTHER PUBLICATIONS

Godefroi et al., J. Med. Chem., 12(5), 784–791, (1969).

Reedijk, J. Inorg. Nucl. Chem., 33(1), 179–188, (1971).

*Primary Examiner*—G. Thomas Todd

[57] ABSTRACT

Imidazole compounds are obtained from the reaction of substituted imidazoles and epoxides of unsaturated fatty acid derivatives, including amides and esters, and unsaturated long chain hydrocarbons. Solutions of the resulting imidazoles in water immiscible solvents are effective in removing metal cations such as copper, mercury, cobalt, lead and zinc from their solutions in water.

4 Claims, No Drawings

N-IMIDAZOLE COMPOUNDS AND THEIR COMPLEX METAL DERIVATIVES

BACKGROUND OF THE INVENTION

1. Field of the Invention

This invention relates to imidazole compounds and to processes for the extraction of metalic cations from water solutions.

2. Description of the Prior Art

Imidazole and its derivatives e.g. histidine are known to form complex compounds with metal ions, which, depending on the particular metal and imidazole, are both soluble and insoluble in water. So far as is known, technical literature does not disclose imidazole metal complexes which are soluble in water-immiscible solvents.

DeGroote et al., U.S. Pat. No. 3,049,492 discloses a large number of amine-epoxide reaction products which are useful bactericides in the presence of soluble ferrous salts. There is no indication that the amine-epoxide reaction products are complexed with ferrous ion.

BRIEF SUMMARY OF THE INVENTION

The compounds of this invention are the imidazoles and imidazolines having the following structures:

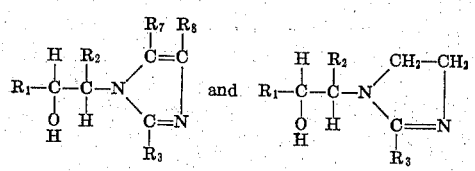

wherein: $R_1$ and $R_2$ are selected from the group consisting of hydrogen, alkyl having 6 to 40 carbon atoms, cycloalkyl having 5 to 12 carbon atoms, alkyl substituted cycloalkyl having 5 to 40 carbon atoms,

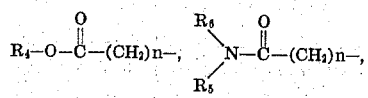

lower alkyl phenyl oxymethylene; $R_4$ is alkyl having 1 to 13 carbons; $R_5$ and $R_6$ are hydrogen and lower alkyl; n is an integer in the range of 1 to 18; $R_3$ is hydrogen and lower alkyl: $R_7$ and $R_8$ are hydrogen, lower alkyl and $R_7$ and $R_8$ together with their carbon atom form an aromatic ring: with the proviso that only one of $R_1$ and $R_2$ is ever hydrogen.

These imidazole and imidazoline compounds are usful in the extraction of heavy metals having an atomic number greater than 26 including copper, cobalt, mercury, lead and zinc. Extraction of these metals is accomplished by contacting a solution of the imidazole and imidazolines dissolved in a 90/10 ratio, by volume, mixture of kerosene and long chain fatty alcohol with an aqueous solution of the aforementioned metals having an atomic number of at least 27.

DETAILED DESCRIPTION

The extraction of metal cations from aqueous solutions by immiscible liquid-liquid extraction procedures involving the transfer of metal ions from water into the organic phase using metal complexing agents has long been known and such procedures are used industrially in the refining of metals. For optimum performance and economic usage, the metal complexing agent must: (1) have a strong absorptive action, (2) be soluble in low cost hydrocarbon solvents, (3) have a low emulsification tendency in order to give an adequate and rapid phase separation, (4) have adequate chemical stability under prolonged usage, (5) have a chemical selectivity toward specific metal cations under controlled conditions of operation, (6) have a high loading capacity, (7) rapidly reach an equilibrium state during normal phase mixing, and (8) be capable of again releasing the metal component from the organic phase in subsequent treatments. Another property, often desired, is that the agent for specific extraction purposes has optimum activity over a controlled range of hydrogen ion concentration (pH) and that the agent itself does not cause appreciable fluctuations in the hydrogen ion level (pH) upon the absorption or release of the metal ions. Heretofore, the above mentioned requirements has not been realized in one agent.

It has been discovered that the above mentioned requirements are more nearly met using chemical compounds containing the N-(substituted-β-hydroxylethyl)imidazole moiety:

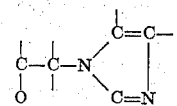

These products have a molecular weight range of about 250 to 550.

Representative compounds of the above mentioned type are prepared by reacting imidazoles, or imidazolines, with epoxides having the structure:

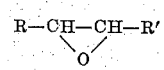

In this reaction, the single reactive hydrogen of the imidazole, or imidazoline, reacts with the oxygen of the epoxide to form the corresponding β-hydroxyl ethyl derivative, in accordance with the well known chemistry of epoxide reactions.

The imidazoles and imidazoline used in preparation of the composition aspect of this invention are those with the following structures:

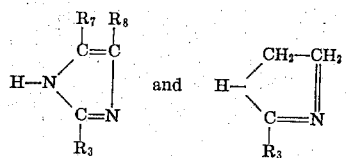

Representative compounds covered by the above structural formulas when $R_3$ is hydrogen are imidazole, imidazoline and benzimidazole. When $R_3$ in the above formula is lower alkyl, the corresponding imidazole, imidazoline and benzimidazole is intended. In the above formula $R_7$ and $R_8$ may be hydrogen, lower alkyl or together with their carbon atoms may form an aromatic ring as follows:

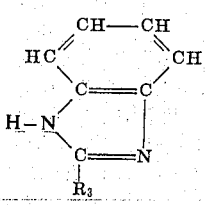

The resulting benzimidazole can also bear substituents on the benzene ring.

Epoxides useful in the practice of this invention are obtained by the epoxidation of olefinic compounds by conventional means. The olefinic compounds which, after epoxidation, are used to prepare the compounds of this invention are: the esters and N-alkylsubstituted amides of unsaturated long chain fatty acids, wherein the fatty acid portion of the ester and amide have 10 through 26 carbon atoms; mono unsaturated olefins having 10 through 30 carbon atoms; and unsaturated long chain ethers having from 10 through 30 carbon atoms.

The preferred epoxides are those derived from mono unsaturated compounds i.e., those having a single double bond. In practice it is found that suitable complexing agents can be obtained from compounds having more than one double bond. For example many of the commerical oils contain large amounts of linoleic acid, a di-unsaturated acid, e.g. tall oil contains 46 percent linoleic acid. Excellent complexing agents have been obtained from the epoxides of tall oil esters. The preferred epoxides from olefin hydrocarbons are those derived from aliphatic mono-olefins having from 6 through 40 carbon atoms. Typical examples are 1-dodecene, 1-octadecene, 9-octadecene and 1-tetadecene.

The preferred epoxides from unsaturated fatty esters are those derived from mono-unsaturated long chain fatty esters having 10 through 26 carbon atoms. Oleic acid esters are noteworthy because of the availabiliity of oleic acid commercially. Thus, examples of oleates which form epoxides falling within the purview of this invention are methyl oleate, propyl oleate, butyl oleate, cyclohexyl oleate, 2-ethyl hexyl oleate, decyl oleate, 1,1,3,3-tetramethylbutyl oleate and the like.

Suitable epoxides for the preparation of the compositions of this invention are obtained from commercially available oils. These oils contain large amounts of unsaturated fatty acids, usually oleic and linoleic acids, and after being esterified with alcohols, the resulting esters can be epoxidized and used without further purification in reaction with imidazoles to obtain compositions which are excellent complexing agents. Examples of commercial oils useful in the preparation of the compounds of this invention are the oils derived from corn, cottonseed, mustard seed, olive, palm, peanut, and soybean. Others such as tall oil and neatsfoot oil are also useful starting material for the preparation of epoxidized fatty acid esters and amides. The compounds of this invention derived from 2-ethylhexyl esters of tall oil have been found to be very effective complexing agents and the low cost of tall oil further enhances their attractiveness for commerical use.

These oils are all available commercially and some of them are also available as epoxy esters. For example, Drapex 4.4 is the tradename for an epoxidized 2-ethylhexyl ester of tall oil and is sold by Argus Chemical Co. of Brooklyn N.Y.

Generally with epoxides derived from esters of these commerical oils, especially those containing large amounts of linoleic acid, it is desireable to limit the amount of epoxide group in the product to between 4 through 8 percent oxirane oxygen with 5 percent being the preferred range. For example, Drapex 4.4 contains about 4.5 percent oxirane oxygen.

The structure of the compounds of this invention will depend on the direction the epoxy ring opens in its reaction with imidazole. In the unsaturated fatty ester epoxides it is expected that the ring will open either way as shown in the following equation.

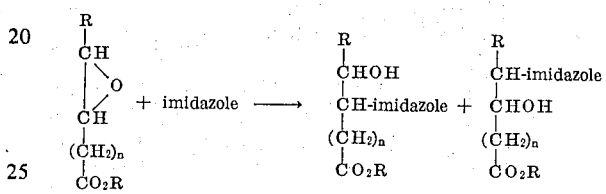

Accordingly, the imidazoles and imidazolines of this invention are mixtures.

A variety of epoxides, suitable for the practice of this invention, may also be obtained by the reaction of epichlorohydrin with various substances to yield gylcidyl ethers having the general structure:

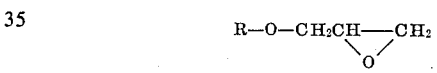

where R is an aliphatic or cyclic hydrocarbon group containing at least 10 carbon atoms. For example, sodium p-octylphenolate reacts readily with epichlorohydrin to give p-octylphenyl glycidyl ether (b.p. 150°–152°C/1mm, n 25°/D 1.5110). Naphthols react in similar fashion to yield naphthyl glycidyl ethers. Sodium alcoholates of long chain alcohols, likewise, yield long chain alkyl glycidyl ethers. Upon reaction with imidazoles or imidazolines, these epoxides yield the corresponding N-(substituted-β-hydroxy ethyl) imidazole derivatives having the general structure indicated above.

In an alternative procedure, the imidazole or imidazoline, dissolved in an inert solvent such as anhydrous dimethyl formamide may be reacted with sodium as shown below, which, reacted with epichlorohydrin, yields 1, 2-epoxy-3-(1-imidazolyl) propane:

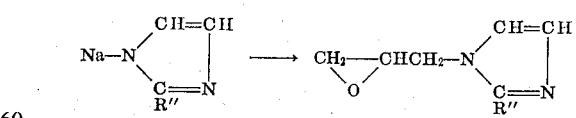

The above epoxide reacts readily with compounds containing a reactive hydrogen, such as phenols, alcohols and amines. For the practice of this invention, alkyl phenols, long chain alcohols or long chain amines containing at least 10 carbon atoms per molecule are preferred in the above mentioned reaction.

Imidazoles and imidazolines are known catalysts for the polymerization of epoxide compounds and resins, and it is desirable that the epoxide used in the practice of this invention have a low tendency toward self-polymerizaiton through the epoxide groups. Generally, epoxidized di- and tri glycerides of unsaturated fatty acids are not suitable because they have an excessive tendency to polymerize.

To insure adequate solubility in water-immiscible, hydrocarbon solvents, such as benzene, xylene, ethylbenzene, cumene, kerosene and various commercial aromatic and aliphatic hydrocarbon solvents, or long chain ketones or ethers, the epoxide compound should contain at least 10 carbon atoms in its structure which may be linear, branched chain or cyclic. The epoxide compound may also contain groups which are inert with respect to the epoxide group or the single reactive hydrogen of the imidazole reagent, such as ether, amide, ester, or nitrile groups.

Imidazole and imidazoline derivatives of low molecular weight epoxides, such as 1,2-epoxypropyl isopropyl ether, allyl glycidyl ether, styrene oxide, cyclohexene oxide, and phenyl glycidyl ether, are not suitable for the practice of this invention since they have limited solubility in hydrocarbon solvents and tend to give insoluble metal complexes.

Of the various imidazoles and imidazolines that may be used in the practice of this invention, the preferred reagent is imidazole, also known chemically as 1,3-diazole, or as glyoxaline, and as iminazole. Imidazole is more reactive with epoxide groups than imidazoles which have alkyl substitutions in the 2-position, especially when such alkyl groups contain more than three carbon atoms. The reaction of epoxide groups with 2-alkyl substituted imidazoles may be accomplished by operating the reaction at higher temperatures, and longer reaction periods.

The composition aspect of this invention is obtained from the reaction of imidazole, in slight excess over the calculated theoretical amount, with the appropriate epoxide. A mixture of these two components is heated with mixing until the desired reaction temperature, usually about 85°C., is reached. The mixture is usually held at this temperaature. The residual imidazole contant may be determined by removing aliquot portions of the reaction mixture and by extraction of the unreacted imidazole with water and titration with a standard acid solution. When the residual imidazole content in the reaction composition shows a constant value, usually after 2 to 4 hours heating interval, the end point of the reaction is indicated. The composition is then dissolved in a water-immiscible solvent and the solution extracted with water to remove residual imidazole. Usually two or three water extractions are sufficient to remove all of the imidazole. The organic solvent may then be removed by distillation under reduced pressure, or if a selected suitable solvent is used, the solution obtained may be used directly for metal chelation procedures.

The reaction of 2-alkyl imidazoles and various imidazolines with selected epoxides may be carried out in a similar manner. However, higher temperatures and longer reaction periods at specific temperatures may be required.

High temperatures should be avoided to minimize polymerization of the epoxide groups. In most cases, a gradual increase in temperature is desirable as the reaction, as measured by analysis, becomes progressively more complete. However, temperatures of 120°C. and higher should be avoided, over prolonged periods of an hour or more.

Products obtained by the above mentioned procedures, dissolved in water immiscible solvents, are outstandingly effective for the rapid and essentially complete removal of metal cations having an atomic number of at least 27, such as mercury, cobalt, lead and the like, from aqueous systems. Hence, these agent are particularly useful for the removal of toxic metal ions from the waste water of industrial plants. For example, a water solution containing 100 ppm (parts per million) of mercury ions brought into contact and mixed for one-half minute with an equal volume of a 5% solution of a preferred agent of this invention in a water immiscible solvent, such as the agent of Example I, after standing briefly for phase separation, will show less than 0.02 ppm residual mercury in the water phase. Likewise, under similar conditions and a pH range of about 3 to 8, the extraction of copper ions from dilute solutions is normally over 99% complete. Very dilute solutions of these agents can show a limited extraction, depending upon the metal ion concentrations, but one or more subsequent extractions will readily remove the last traces of the metals. Compared with commercially available, industrial complexing agents, the products of this invention have shown outstandingly better extraction performance as is illustrated in the examples given below.

Another important advantage shown by the products of this invention is that, in use, these novel agents, in contrast to many industrial agents, do not release hydrogen ions and thus have little or no effect on the acidity (pH) of the aqueous phase. Industrial agents, such as oximes and di-2-ethylhexyl hydrogen phosphate, frequently need close control of acidity during their use as extraction agents. A further advantage shown by the products of this invention is that the presence of dissolved iron does not interfere with their capacity for metal ions such as copper, nickel, cobalt, mercury or zinc.

The above and other advantages are illustrated by the examples given below. In these examples the metal ion extractions, unless otherwise specified, were carried out by (a) mixing vigorously, in a separatory funner, for 1 minute, solutions of the compounds of this invention at a specified concentration in a water immiscible solvent with an aqueous solution of a metal salt having a specified metal ion content, in one/one volume ratio, (b) allowing the mixture, when placed in a separatory funnel, to stand for one hour and then (c) drawing off a sample of the aqueous layer for analysis. The metal content of the initial and extracted solutions was measured by the standard atomic absorption analytical procedures using a Perkin-Elmer No. 103 unit. The examples are illustrative of the results obtainable and are not intended to limit the scope of this invention.

The preferable epoxides are the mono epoxides, i.e. those derived from mono-olefins. Compounds having predominantly more than one epoxide group per molecule, such as the epoxidized glycerides of unsaturated fatty acids or of polyunsaturated fatty acids, tend to cross-link to viscous polymeric products which have poor solubility in hydrocarbon solvents and usually have a strong emulsifying tendency when mixed with aqueous systems. Likewise, the polyepoxide products of the Epon resin type are not operable in this invention since they readily crosslink to form insoluble resins.

While there is a preference for mono epoxides, some di-epoxide may be tolerated, especially compounds having the epoxide groups in close structural proximity to each other. As mentioned, the epoxides derived from esters of commercial oils are also useful in this invention. Many of these commercial oils contain linoleic acid, a di-olefin in which the double bonds are in close structural proximity to each other. It is assumed that even limited epoxidation of linoleic acid will lead to a small amount of di-epoxide. However, the presence of small amounts of di-epoxide in the epoxidized and esterified tall oil has not presented any problems.

The compounds of this invention are employed as solutions in water immiscible solvents. Generally from about 2 to about 35% by weight per hundred milliliters of solvent are employed. Preferably, from 2 to 20 is used.

The water immiscible solvent is generally kerosene or kerosene modified by the addition of from 5 to 15%, by volume, of long chain aliphatic alcohol. Xylene and mixtures thereof with hydrocarbon solvents may also be employed as the water immiscible solvent. Water immiscible ethers, ketones and halocarbons may also be used.

Frequently, when water and organic solvents are mixed, an emulsion or a stable suspension forms. These suspensions or emulsions must be broken in order to recover the water phase. In this invention it has been found desireable to add long chain fatty alcohols to the kerosene in order to facilitate solubility of the agent and also the separation of the organic and water phases. Compounds which reduce the surface tension of water or modify the ionic character of the aqueous solution may also be added in order to facilitate phase separation.

The process of contacting waters from which it is desired to remove metal ions with solutions of the compounds disclosed herein may be accomplished with any commercially available mixing equipment followed by phase separation by means of a centrifuge or settling tanks.

The following examples illustrate the compounds of this invention, their method of preparation and their use in the extraction of metal ions.

EXAMPLE I

A mixture comprising 10.53 parts by weight dry crystalline imidazole and 50 parts of epoxidized tall oil acid ester, containing 4.5% oxirane oxygen, was heated with mixing, to 85°C and then held at this temperature for a total of 64 hours. Analysis of an aliquot sample of the reaction composition for residual imidazole, by extraction with water and titration with standard acid to pH 5.5, indicated that the reaction of imidazole with epoxide groups was over 90% of theoretical. The reaction product was dissolved in an equal volume of benzene and the solution extracted three consecutive times with water to remove residual imidazole. The benzene solution was warmed to 80°C. under reduced pressure to remove the benzene and residual water. The product, hereinafter, compound I was a clear, brown liquid which became very viscous when cooled to room temperature. The yield was over 95% of theory. Compound I was soluble in aromatic type hydrocarbon solvents and in aliphatic solvents containing about 10% by volume of a long chain aliphatic alcohol, such as decyl alcohol or 2-ethylhexanol. A 10% solution of compound I in 90/10 volume ratio of kerosene/2-ethylhexanol when mixed with an equal volume of water and allowed to stand briefly for phase separation, gave a pH value of 6.9 in the water phase, indicating that the above product was essentially neutral. Moreover, the extraction of metal ions from the water phase by solutions of compound I did not increase the acidity of the water phase as shown in table I below.

A comparison of the outstanding complexing activity of Compound I, described above, with commercial agents now widely used in liquid/liquid extraction procedures is illustrated in Table I.

Table I summarized the results of extractions of varying amounts of copper ion from water using 10 grams of Compound I in 100 ml. of solvents. The solvent is a 90/10 volume ratio of kerosene and 2-ethyl-hexanol. About equal volumes of water and organic solution, (organic phase) and mixed for 1 minute in a separatory funnel and allowed to separate. After 1 hour, samples are taken from the water phase and analyzed for pH and copper content.

TABLE I

| Agent | Extractions with Compound I. | | | | % of Initial Copper Content Extracted |
|---|---|---|---|---|---|
| | Initial Water Phase | | Extracted Water Phase | | |
| | mg/l | pH | mg/l | pH | |
| LIX-64-N* | 1000 | 4.45 | 545 | 2.80 | 45 |
| Example I | 1000 | 4.45 | 5.1 | 5.45 | 99+ |
| do. | 500 | 4.60 | 3.0 | 5.80 | 99+ |
| do. | 250 | 4.60 | 2.3 | 6.20 | 99+ |
| do | 200 | 4.80 | 0.95 | 4.10 | 99+ |
| LIX-64-N*(1) | 200 | 4.80 | 31.7 | 3.20 | 84 |

*LIX-64-N is the trademark for General Mills alkyl substituted benzophenone oxime.
(1)Organic phase washed with 10% of aqueous KH₂PO₄ in ½ volume ratio prior to use as extraction phase.

The influence of acidity of the aqueous phase on the extraction activity of Compound I could best be shown by using very diluted solutions of the product in the organic phase, as indicated in Table II below. The extractions were carried out in the standard manner with 1 minute mixing and 1 hour phase separation time. The acidity (pH) adjustments of the aqueous phase were made by adding the required amounts of conc. sulfuric acid to the aqueous copper sulfate solution containing 100 mg/l copper metal content. The organic phase, prior to use, was washed twice with 5% sulfuric acid and then twice with water.

TABLE II

Effect of Acidity (pH) of Aqueous Phase on Extractions with 1.5g. compound I per 100 ml. of 90/10 volume ratio of Kerosene/2-ethylhexanol; Aqueous Copper Sulfate at 100 mg/l. copper metal content.*

| Aqueous Phase Ph | | |
|---|---|---|
| Adjusted Initial | After Extraction | % of initial copper Extracted. |
| 5.20 | 3.20 | 73.9 |
| 4.20 | 3.20 | 70.7 |
| 3.40 | 3.15 | 65.9 |
| 3.00 | 3.20 | 49.8 |
| 2.40 | 2.85 | 19.5 |
| 2.00 | 2.70 | 16.1 |

*Organic/aqueous 1/1 volume ratio.

The above data indicate that the compound I can extract copper from aqueous solutions even at high acidity (low pH values) but that extraction is more effective at the higher pH values. Moreover, these data show that copper can again be extracted from the organic phase, when the extraction was carried out initially at a higher pH value, by bringing the organic phase into contact with an aqueous phase of lower, or very low, pH (i.e. higher acidity).

Evaluations of the compound I have demonstrated that it is particularly active in the extraction of heavy metals such as mercury from aqueous solutions. For example, when an aqueous solution containing 100 mg/l mercury, as mercuric nitrate, was mixed briefly (10 to 30 seconds) with an equal volume of a 4% solution of compound I in 90/10 volume ratio of kerosene/2-ethylhexanol, and a brief phase separation was allowed to take place, the mercury content of the water phase was reduced to less than 0.02 mg/l as shown by atomic absorption spectrometer analysis. Thus, such products are particularly useful for the removal of dissolved mercury and other toxic metal ions from the waste water effluent of industrial plants. Silver can likewise be extracted from dilute aqueous solutions in better than 99.5% efficiency and is easily recoverable, by well known procedures, from the organic extraction phase. Such procedures afford not only antipollution environmental control but, also, afford a process for the recovery of valuable industrial metals.

EXAMPLE II

A solution of 9.72 parts of dry, crystalline imidazole dissolved in dioxane was warmed to 92°C. and to this was added gradually and uniformly, at 92°–113°C. over a period of about 8 hours, a total of 50 parts of epoxidized 2 ethylhexyl oleate, containing 4.15% epoxide oxygen. When all was combined, the reaction solution was held at 113°–114°C. for an additional 15 hours. Analysis for residual imidazole, as described in example I, indicated that the reaction of the oxirane groups was about 87% complete. The product, hereafter compound II, was dissolved in benzene and the solution washed twice with water to remove the residual imidazole and dioxane. The benzene and residual water was then removed by warming to 80°C. under reduced pressure. The yield of compound II was over 95% of theoretical. The product was soluble in aromatic solvents, such as xylene, and in kerosene/long chain alcohol mixtures. The excellent complexing properties of this product and, further of example I, are illustrated in table III below. The extracting agent in each case is used at 40 grams/liter concentration and 90/10 kerosene/2-ethylhexanol solution.

TABLE III

| Extraction Agent. | Copper extracted from Copper Sulfate solution. | | | | |
|---|---|---|---|---|---|
| | Initial water mg/l metal | pH | Extracted mg/l | aqueous pH | % metal Extracted. |
| LIX-64-N | 100 | 3.00 | 78 | — | 22% |
| LIX-63 | do. | do. | 85 | — | 15 |
| Compound I | do. | do. | 0.27 | — | 99+ |
| Compound II | do. | do. | 0.27 | — | 99+ |
| LIX-64-N | 200 | 4.6 | 119 | 3.2 | 40 |
| LIX-63 | do. | do. | 151 | 3.4 | 25 |
| Compound I | do. | do. | 4 | 5.6 | 98 |
| Compound II | do. | do. | 0.8 | 5.7 | 99+ |
| LIX-64-N | 1000 | 4.4 | 477 | 3.0 | 52 |
| Compound I | do. | do. | 200 | 5.9 | 80 |
| Cobalt Extracted from Cobalt Sulfate Solution. | | | | | |
| LIX-64-N | 200 | 5.4 | 127 | 4.0 | 36% |
| LIX-63* | do. | do. | 162 | 3.6 | 19% |
| Compound I | do. | do. | 64 | 5.7 | 68% |
| Compound II | do. | do. | 88 | 5.7 | 56% |
| Lead Extracted from Lead Nitrate Solution.** | | | | | |
| LIX-64-N | 100 | — | 89 | — | 11% |
| LIX-63 | do. | — | 89 | — | 11% |
| Compound I | do. | — | 53 | — | 48% |
| Compound II | do. | — | 31 | — | 69% |

*LIX-63 is the General Mills Corporation trademark for their alphatic oxime.

An alternative preparation of compound II is set forth in Example III.

EXAMPLE III

To a solution of 67 parts imidazole in 200 parts xylene, warmed to 75°C., was added over a period of about 2 hours, a total of 403 parts of epoxidized 2-ethylhexyl oleate containing 4.15% oxirane oxygen. The temperature was then increased to 85°C. and held at 85° to 95°C. for an additional 8 hours. The dark colored solution was mixed well with 200 parts water and allowed to stand for phase separation. The aqueous lower layer was removed and the product again washed with 200 parts water. Analysis of the combined water washings for residual imidazole indicated that the reaction of epoxide groups was over 90% complete. The xylene solution of compound II was next washed twice with dilute hydrochloric acid. After standing for several hours for final phase separation, the residual xylene solution of the product had a clear brown color; removal of the xylene under reduced pressure with warming gave a viscous liquid which was soluble in hydrocarbon solvents, including kerosene, commercial Cyclosol 150, and No. 2 grade fuel oil.

Solutions of compound II at 10 to 20% weight-/volume concentrations (grams/100 ml) had excellent complexing properties and showed selectivity absorption for copper as indicated in the tabulation below.

when a mildly exothermic reaction was indicated. Slight cooling was required, after which the temperature was held at 100°C. for 8 hours. The composition was diluted with xylene to a concentration of about 40% product designated compound III. This solution was washed twice with water, the last washing showing only a trace of imidazole content. Further dilutions with xylene gave solutions, which at 2 to 10% concentrations, had excellent complexing properties for cop-

TABLE IV

Compound II in Kerosene/isodecyl alcohol (95/5 volume ratio) at 10 grams/100 ml concentration, with varied contact mixing periods and varied pH levels.

2 minute contact time.

| Initial Extraction solution g/l metal | | pH | Loaded organic solvent g/l metal | | Residual raffinate g/l | | percent extraction | |
|---|---|---|---|---|---|---|---|---|
| Cu | Fe | | Cu | Fe | Cu | Fe | Cu | Fe |
| 0 | 3.9 | 2.0 | 0 | 0.25 | 0 | 3.79 | 0 | 3.8% |
| 3.15 | 0 | 2.0 | 0.9 | 0 | 2.60 | 0 | 14.0 | 0 |
| 1.55 | 1.95 | 2.0 | 0.85 | 0.20 | 1.14 | 1.85 | 26.5 | 5.1 |
| 1.55 | 1.95 | 1.5 | 0.52 | 0.10 | 1.26 | 1.90 | 12.2 | 2.5 |
| 1.55 | 1.95 | 1.0 | 0.32 | 0.11 | 1.38 | 1.89 | 10.3 | 2.4 |
| 1.5 minute contact time. | | | | | | | | |
| 1.55 | 1.95 | 2.0 | 0.78 | 0.10 | 1.17 | 1.90 | 24.5 | 2.5 |
| 1.0 minute contact time. | | | | | | | | |
| 1.55 | 1.95 | 2.0 | 0.69 | 0.11 | 1.20 | 1.89 | 21.9 | 2.4 |
| Compound II at 20 grams/100 ml concentration | | | | | | | | |
| 2.0 minute contact time. | | | | | | | | |
| 0 | 3.9 | 2.0 | 0 | 0.4 | 0 | 3.70 | 0 | 5.0 |
| 3.15 | 0 | 2.0 | 1.75 | 0 | 2.30 | 0 | 25.4 | 0 |
| 1.55 | 1.95 | 2.0 | 1.65 | 0.45 | 0.72 | 1.76 | 53.6 | 9.7 |

Cu = copper, Fe = iron, content in grams/liter; Organic/aqueous phase, 1/2 volume ratio.

The above tabulated data show the preferable extraction of copper from aqueous solutions containing iron.

The extraction of copper from aqueous solutions by these agents is favored by decreased acidity (higher pH values) but is only slightly affected by the choice of solvent, as is indicated by the data summarized in table V below.

TABLE V

Compound II at 10% weight/volume ratio* solvent A or B at different pH values.

| Aqueous Phase pH | %metal copper | extracted cobalt | nickel | Organic phase Solvent.** |
|---|---|---|---|---|
| 4 | 30.0 | 2.0 | 0.1 | A |
| 6 | 45.0 | 4.0 | 3.0 | A |
| 8 | 48. | 10.0 | 4.0 | A |
| 4 | 35 | 2.0 | 0.1 | B |
| 6 | 48 | 3.5 | 2.5 | B |
| 8 | 52 | 15.0 | 4.0 | B |

*Experimental conditions same as for Table IV, contact time 2 minutes., initial metal concentrations 1.0 grams/liter. O/A ratio 1/1; phase separation 3 to 6 minutes.
**Solvent A = Cyclosol 150/isodecyl alcohol in 95/5 volume ratio. Solvent B = kerosene/isodecyl alcohol in 95/5 volume ratio.

EXAMPLE IV

A mixture of 40 parts of an epoxidized fatty acid ester, available commercially as Kronisol 90 (3.9% oxirane oxygen, Molecular weight 354) from FMC Corporation of New York, N.Y. and 6.8 parts of imidazole was gradually warmed, with stirring, to about 90°C.

per, cobalt, nickel, lead and mercury when tested by the procedures of examples I thru III given above. Such solutions showed red to blue complex metal colors.

EXAMPLE V

Dodecene-1 was converted to 1,2-epoxydodedecane by the general procedure of example 1 of U.S. Pat. No. 2,457,328. To 92 parts of this epoxide, dissolved in 18 parts of xylene, was added slowly at 80°–106°C over a period of 1 hour, a solution of 37.4 parts imidazole in 18 parts of dimethylformamide. Slight cooling was required to control the exothermic reaction that took place. The composition was then held at 95°C. for 1 hour and at 90°C. for an additional 12 hours. Upon cooling and standing, the composition crystallized to a solid mass. Analysis for residual imidazole showed that the reaction of epoxide groups was over 90% of theory. Recrystallization of the product from xylene and heptane gave a pure product melting sharply at 68°C.

A solution of the β-hydroxy-1-dodecylimidazole, at 5g/100ml concentration, in diisopropylketone, was used to extract copper from aqueous solutions of copper sulfate and copper chloride containing 100mg/l copper with 1/1 ratio by volume of organic/aqueous phase. With 1 minute contact time and standing for phase separation, both extractions were over 98% with a single extraction cycle.

EXAMPLE VI

A mixture comprising 25 parts of 1,2-epoxydodecane and 11.56 parts 2-methylimidazole was heated to 82°C with continuous stirring. The 2-methylimidazole dissolved slowly over a period of about 3 hours. The composition was then held at 88°–90°C. for an additional 36 hours. Analysis of the composition for residual 2-methylimidazole by extraction with water and titration, as described in prior examples, indicated that the reaction of epoxide groups was over 85% complete. The product was dissolved in an equal volume of benzene. The solution was washed several times with water and the solvent and water then removed under reduced pressure with warming. Solutions of the product in organic solvents had desired solubility characteristics in water immiscible organic solvents and have outstanding chelating activity for extracting rapidly from water systems the dissolved metal ions of metals such as copper, cobalt, nickel, mercury, and lead. Other metal ions that are extractable are bismuth, zinc, cadmium, silver, gold, platinum, cerium and the rare earth metals.

Similar results were obtained with 2-ethylimidazole and 2-propylmidazole but the reaction, in each case, was much slower so that higher temperatures of 100–120°C. was required to complete the reaction. Such products were somewhat less active as chelating agents than the product above.

EXAMPLE VII

A mixture of 10.4 parts p(1,1,3,3-tetramethybutylphenyl) glycidyl ether, 8 parts xylene and 2.79 parts imidazole was heated to 80°C to give a homogeneous, compatible solution. Further warming, with stirring, to 85°C. promoted an exothermic reaction with a gradual temperature increase to 103°C. without further application of heat. After cooling to 100°C. the composition was held at this temperature for an additional 8 hours, applying heating when required. The product was completely soluble in aromatic hydrocarbon solvents and in aliphatic hydrocarbons containing low proportions of long chain alcohols, such as decyl alcohol. The residual imidazole was removed by washing with water as explained in examples V and VI above. The purified product had strong chelating properties for metal ions as described in the foregoing examples. Copper ions could again be extracted from the organic phase of such extractions by exposure to an aqueous phase of high acidity within the range of pH 0.5 to about 1.5. The copper thus extracted could be deposited electrolytically from the aqueous phase, by known procedures, to give a bright metallic copper deposit of very high purity.

EXAMPLE VIII

To a clear solution of 30 parts 2-methylimidazoline (m.p. 106°C.) dissolved in 278 parts warm xylene at 80°C was added, with continuous stirring, at 85°–90°C. over a period of 2 hours, a total of 109 parts of 1,2-epoxyoctadecane, prepared by the process of example II of U.S. Pat. No. 2,457,328. The composition was then heated to 100°C. and held at this temperature for 18 hours. The solution was cooled and washed three consecutive times with water using equal portions. A titration of an aliquot portion of the combined washings, as described in example I, indicated that the reaction of 2-methylimidazoline with epoxide was over 90% of theory. The weight yield was over 95% of theory. The xylene solution had a reddish brown color.

Chelation tests of the above product carried out as described in the foregoing examples, showed a very strong chelating activity for copper, cobalt and mercury ions. At the lower pH values, the product had a preferential chelation for copper.

Other 2-alkylimidazolines, such as 2-ethylimidazoline, 2-propyl-imidazoline and 2-butylimidazoline could be used in place of 2-methylimidazoline as described above. However, as the size of the alkyl group increased, the reaction rate became slower and higher temperatures and longer reaction periods were required. Moreover, the chelating capacity also gradually decreased as the size of the 2-alkyl substituent was increased from methyl to butyl.

EXAMPLE IX

To a clear solution of 30 parts 2-methylimidazoline in 90 parts xylene heated to 85°C. was added, with mixing at 95°–100°C., a total of 180 parts epoxidized fatty acid esters (used in Example II), over a period of about 15 hours. The composition was washed consecutively with equal volumes of (1) water, (2) 5% aqueous hydrochloric acid and (3) 200 parts of 5% aqueous sodium chloride. The washed composition, containing about 70% by weight chelating agent, was completely miscible with aromatic solvents such as cumene, turpentine, and alkybenzenes. It was also readily soluble in aliphatic solvents such as kerosene, stoddard solvent, and similar high boiling solvents containing 5 to 10% of long chain alcohol, such as decyl and isodecyl alcohol and 2-ethylhexanol.

Solutions of the above product in water immiscible solvents, readily extracted copper, cobalt and nickel ions from aqueous solutions with the formation of distinctive chelation colors. Such extractions could be carried out over a wide range of pH values. The metal content of the chelated organic solvent phase could be readily removed by transfer into a water phase of high acidity (below pH 2.0). Copper could be electroplated from these acid solutions as a bright metallic deposit. This could be done, with mild mixing, in contact with the organic solvent phase and a disapperance of the chelation color in the organic phase indicated that the copper removal from the system was complete. Such procedures could also be used to measure quantitatively the copper content of the organic phase.

EXAMPLE X

A mixture comprising 3.66 parts benzimidazole, 10 parts of epoxidized tall oil acid ester (Drapex 4.4) and 9.25 parts dry dimethyl formamide was warmed, with mixing, to 85°C. and then held at this temperature for 84 hours. The clear, light brown solution was diluted with 17.4 parts of toluene and the solution extracted three consecutive times with equal volume portions of water to remove dimethyl formamide and residual benzimidazole. The toluene solution of the product extracted copper ion from an aqueous cupric acetate solution to form a toluene-soluble blue copper complex.

The products of this invention may be used advantageous in combination with other well known chelating agents to obtain desired effects, such as improved solubility in hydrocarbon solvents and better chelation performance. For example, compound I as prepared in example I above, is normally partially soluble in kerosene and similar hydrocarbon solvents. Low amounts of long chain fatty alcohols are added to improve solubility. However, satisfactory solubility in such solvents can also be obtained by the addition of low to moderate amounts of certain known acidic hydrocarbon soluble chelating agent containing an acidic hydrogen, such as many of the oximes, di-2-ethylhexyl phosphate, oleic acid, lauric acid and phenols. Such combinations eliminate the use of alcohols, and may perform as well or better at a given molecular concentration, than either agent used alone at the same concentration. Thus the low cost agents of this invention can be used advantageously in combination with the more costly oxime type of chelating agents available commercially, to lower operating costs. Typical oximes of this type are the alkyl substituted alpha-hydroxy benzoin oximes available as LIX reagents from General Mills, Inc., Minneapolis, Minn.

It is apparent to those skilled in the art of liquid/liquid extractions, sometimes referred to as hydrometallurgy, that a multitude of different test conditions for evaluating chelating agents may be used. The data presented above represent typical results that may be obtained with the products of this invention and do not represent an exhaustive study for developing optimum conditions for their preparation or their usage in specific applications. For example, solvents are generally not required for accomplishing the reaction of epoxides with imidazoles as described previously, but, in some cases, solvents retards the rate of the reaction so that better temperature control can be realized. The temperature range employed and the length of the reaction period may also be adjusted dependent upon the nature of the reagents that are used. Optimum conditions, in each case, can be determined by simple experimentation based on the disclosures given above.

It has been shown that the 1-imidazole type of derivatives are broadly preferred since (1) the raw materials for their synthesis are readily available commercially, (2) they have excellent chemical stability, (3) they show strong chelating ability over a wide range of acidity or alkalinlity, and alkalinity, 4) they show desired specificity, expecially for metal ions having an atomic number greater than 27, under controlled conditions of operation. Moreover, used under preferred conditions, the products of this invention show a low emulsification tendency and rapid phase separation. The above properties are especially important in the selective extraction of metals from aqueous systems and the recovery of such metals in a highly purified form. Moreover, the products of this invention are highly effective in removing low concentrations of toxic metals from aqueous systems, and, therefore, may be used to remove toxic metals, such as copper and mercury, from the waste water effluent of industrial plants.

I claim:

1. A compound from the group consisting of:

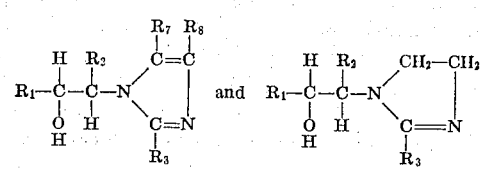

or a complex thereof with a metal ion of atomic number greater than 27 wherein: $R_1$ and $R_2$ are selected from the group consisting of hydrogen, alkyl having 6 to 40 carbon atoms, cycloalkyl having 5 to 12 carbon atoms, alkyl substituted cycloalkyl having 5 to 40 carbon atoms,

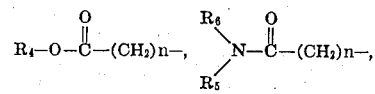

lower alkyl phenyl oxymethylene; $R_4$ is alkyl having 1 to 13 carbon atoms; $R_5$ and $R_6$ are hydrogen and lower alkyl; n is an integer in the range of 1 to 18; $R_3$ is hydrogen and lower alkyl; $R_7$ and $R_8$ are hydrogen, lower alkyl and $R_7$ and $R_8$ together with their carbon atoms form an benzene ring; with the proviso that no more than one of $R_1$ and $R_2$ is hydrogen or a complex thereof with a metal ion with an atomic number greater than 26.

2. A compound of claim 1 wherein $R_1$ is decyl, $R_2$, $R_3$ $R_7$ and $R_8$ are hydrogen.

3. A compound of claim 1 having the formula

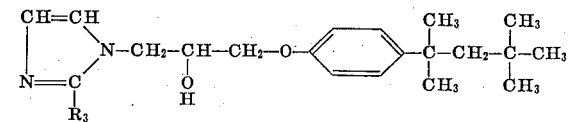

wherein $R_3$ is hydrogen and lower alkyl.

4. The complex of claim 1 wherein the metal is copper, cobalt, nickel, lead, mercury, silver and zinc.

* * * * *

UNITED STATES PATENT OFFICE
CERTIFICATE OF CORRECTION

Patent No. 3,843,667   Dated  October 22, 1974

Inventor(s)  Martin E. Cupery

It is certified that error appears in the above-identified patent and that said Letters Patent are hereby corrected as shown below:

Claim 1, Column 16, lines 14 to 16 cancel "or a complex thereof with a metal ion of atomic number greater than 27"

Signed and sealed this 4th day of February 1975.

(SEAL)
Attest:

McCOY M. GIBSON JR.
Attesting Officer

C. MARSHALL DANN
Commissioner of Patents